Sept. 3, 1968 W. J. TARVER 3,399,478
ANIMAL IDENTIFICATION TAGS
Filed Oct. 21, 1966
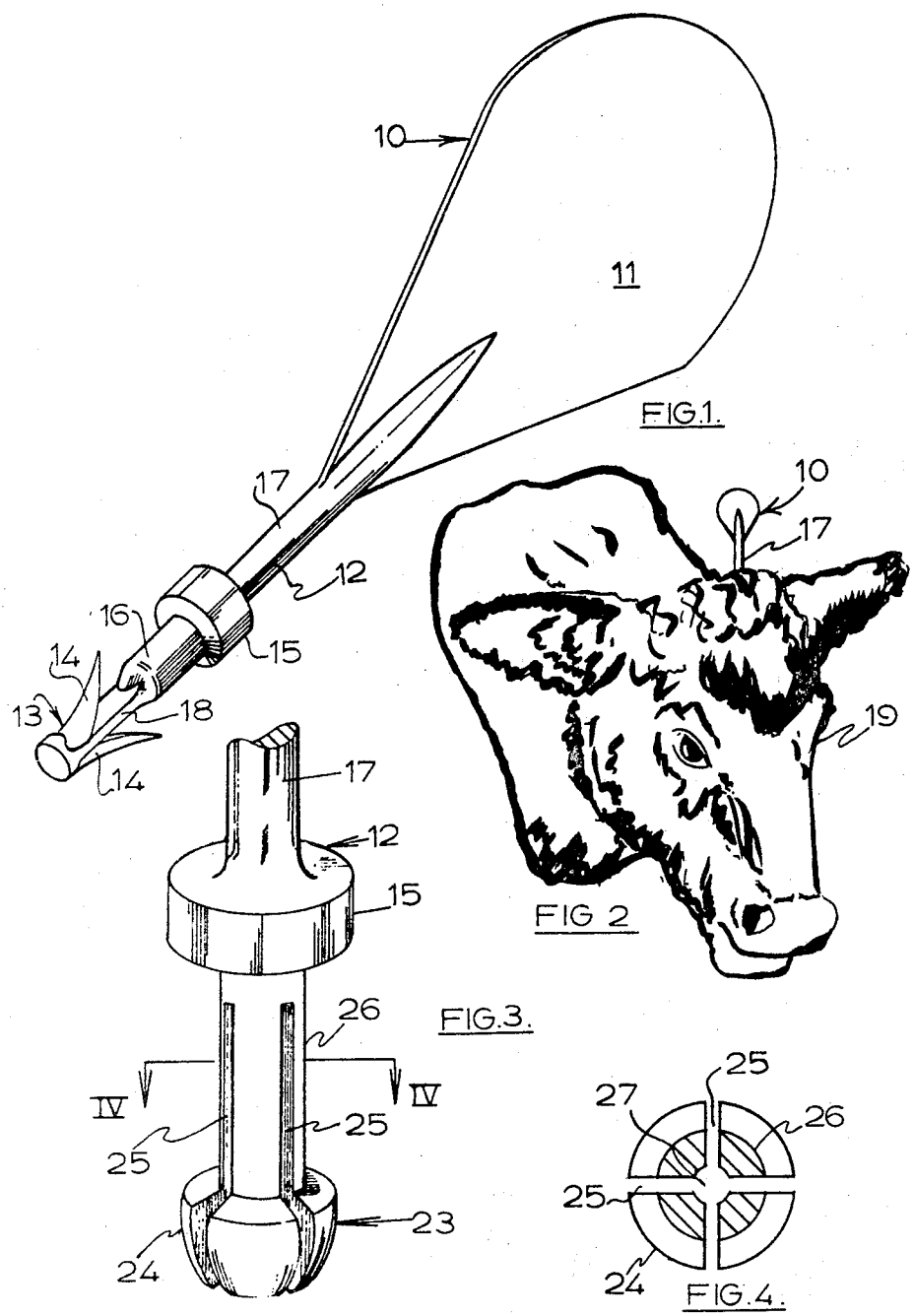
INVENTOR:
WILLIAM JOHN TARVER.
BY
ATTORNEY.

United States Patent Office 3,399,478
Patented Sept. 3, 1968

3,399,478
ANIMAL IDENTIFICATION TAGS
William John Tarver, Preston, England, assignor to National Research Development Corporation, London, England
Filed Oct. 21, 1966, Ser. No. 590,169
12 Claims. (Cl. 40—300)

The present invention relates to a method of implanting identifying means on animals and to animal identification tags.

Known methods of animal identification include tagging the ear of each animal. However, an ear tag is difficult to identify when the animal is at a distance and it is possible to change the original tag "unofficially." Furthermore, ear tags are apt to be torn off in a comparatively short time.

Branding or tattooing has also been used but is not very permanent and brand marks can become difficult to see on animals having a dark coloured hide.

According to one aspect of the present invention, an animal identification tag is provided with a shank and the shank is implanted into an animal's head so as to enter the sinus cavity and the tag is retained by means on said shank within the sinus cavity.

According to another aspect of the present invention an animal identification tag is provided with a shank adapted to be inserted into the head sinus cavity of an animal and means on one end of the shank for retaining that end within said cavity.

Preferably the tag is made of a nontoxic plastics material, for example a polyamide such as nylon, and the shank is a rod joined at one end to a flag or similar identifying portion and at its other end is provided with the retaining means. The retaining means conveniently comprises resilient latching means for cooperating with the inner wall of the animal's sinus cavity when the retaining means is inserted into a hole made in the bone overlying said cavity made by means of a captive bolt gun, for example.

A shoulder may be provided on the shank for determining the extent of penetration of the shank into the cavity.

The flag or identifying means may have any suitable shape which gives the desired identification but preferably has a streamlined shape to prevent the tag from being snagged when the animal rubs against barbed wire, trees, etc.

The latching means may comprise resilient barbs or any other resilient latching device whereby the shank is insertable into the cavity but once inserted, is substantially prevented from subsequent withdrawal.

The invention will be further described, by way of example, with reference to the accompanying drawings, in which:

FIG. 1 is a perspective view of one embodiment of a tag, constructed according to the present invention for identifying animals, FIG. 2 is a view of a cow's head with the identification tag of FIG. 1 inserted in position;

FIG. 3 is a perspective view of a detail of another embodiment of a tag and

FIG. 4 is a section on the line IV—IV of FIG. 3.

Referring now to FIG. 1 of the drawings there is shown an identification tag 10 for implanting in an animal such as a cow or sheep having a sinus cavity. The identification tag has a flag portion 11 and a shank 12 extending from the edge of the flag portion 11. Retaining means 13 are provided on the end of the shank 12. The retaining means comprises a pair of springy barbs 14. The shank 12 has a collar 15 and the portion of the shank between the retaining means 13 and the collar 15 is of somewhat larger diameter than the portion 17 between the collar 15 and the flag portion 11.

The identification tag is moulded from a nontoxic resilient synthetic plastics material such as polypropylene or nylon or other polyamide.

Prior to the insertion of the tag a hole has to be formed in the animal's skull through the horn material present between the horns of the animal and into the sinus cavity of the animal. When a cow is dehorned the sinus cavity can be perceived by looking into the hole left by the removal of the horn. The hole is conveniently made by means of a captive bolt gun conventionally used as a humane killer. However the gun must be modified so that the stroke of the captive bolt is commensurate with the length of the shaft portion 16 of the tag. There must be no danger of the bolt penetrating too far and entering the animal's brain. Such modification is well within the skill of gun manufacturers and indeed within the skill of an average handyman. After the hole has been made the tag 10 is inserted by its shaft portion 16 into the hole. The barbs 14 are flattened against a narrowed extremity 18 of the shank and immediately they enter the sinus cavity they spring out again to their position illustrated in FIG. 1 to prevent withdrawal of the shank. The collar 15 prevents the shank 12 from entering too far. FIG. 2 shows a head 19 of a cow into which an identification tag 10 has been inserted by this method. The tag cannot be removed and the resilience of the thinner shaft portion 17 minimises the risk of the shaft breaking. Should the cow rub its head against a tree or barbed wire the tag simply yields against the rubbing pressure. The flag portion 11 is conveniently flat to enable it to receive a suitable identifying inscription and is preferably of pear shape as illustrated or triangular or diamond shape so as to minimise the risk of snagging.

FIGS. 3 and 4 illustrate a modification of the retaining means of FIG. 1. In FIGS. 3 and 4 the retaining means 23 on the wider shank portion 26 below the collar 15 is provided with a head 24. The head 24 and the shank portion 26 have longitudinal slits 25 which divide the head and shank portion into four segments as can be seen most clearly from FIG. 4. In addition the head and shank portion have a longitudinal bore 27. By this construction the head 24 can be resiliently contracted to enable it to be inserted in the hole previously formed in the animal's head. The crown of the head 24 is conveniently tapered to assist such insertion.

The presently preferred dimensions for a tag as illustrated in FIG. 1, such that it is suitable for insertion into an average British domestic cow are as follows:

| | Inches |
|---|---|
| Diameter of shaft portion 16 | 1/4 |
| Distance from shoulder 15 to tips of barbs 14 (barbs flat against shaft portion 16) | 7/8 |
| Length of barbs 14 | 3/8 |
| Distance from barb tips to end of shaft | 1/2 |
| Length of shoulder 15 | 1/8 |
| Diameter of shoulder 15 | 7/16 |
| Length of portion 17 between shoulder 15 and flag portion 11 | 3/4 |
| Diameter of portion 17 oval | 1/8 x 3/32 |
| Thickness of flag portion 11 | 3/32 |
| Length of flag portion 11 | 2 1/2 |
| Maximum breadth of flag portion 11 (broadest part three eighths of the way from the top) | 1 7/8 |

The bolt travel of the bolt gun required for a tag having the above listed dimensions would be 7/8", so as to correspond to the length between the shoulder 15 and the tips of the barbs 14.

The shaft portion 16 may be of any convenient cross-sectional shape, for example circular, oval or triangular.

The length of the tag between the shoulder and the tips of the barbs and the corresponding bolt travel will depend on the type of animal into which it is desired to insert the tag, for example the length for a sheep will normally be less than for a cow.

Any number of barbs may be used. The shoulder dimensions are not critical and the shoulder may be any convenient shape such that it limits the penetration of the tag into the animal's head, for example it could take the form of further barbs pointing in a reverse direction to the barbs 14.

The flag portion may be formed as a removable attachment by having suitable connecting means placed between the flag portion and the shoulder or shank. A flag portion could then be fitted to a tag after it has been inserted into the animal's head.

The flag portion may be made as a hollow body which could then contain electrical indicating means such as a flashing light or miniature radio transmitter.

I claim:

1. An identification tag for an animal having a sinus cavity comprising a flag portion adapted to receive an identifying inscription thereon; a shank extending from said flag portion and adapted to be inserted in the animal's head until an end portion of said shank enters said sinus cavity of said animal; and retaining means on said end portion of said shank for retaining said shank in position.

2. A tag according to claim 1 in which said retaining means comprises resilient latching means.

3. A tag according to claim 1 in which said retaining means comprises a plurality of springy barbs extending from said end portion of said shank.

4. A tag according to claim 1 in which said retaining means comprises a head on said end portion of said shank, said head and said shank end portion having longitudinal slits therein to render said head resiliently contractible to permit insertion into the animal's head.

5. A tag according to claim 1 which further comprises stop means on said shank and spaced from said retaining means by a distance commensurate with the desired depth of penetration of said shank into the animal's head.

6. A tag according to claim 5 in which said stop means comprises a collar on said shank.

7. A tag according to claim 6 in which said shank has a larger diameter portion between said retaining means and said collar and a smaller diameter portion between said collar and said flag portion.

8. A tag according to claim 1 in which said flag portion comprises a flat plate and said shank extends laterally from an edge of said flat plate.

9. A tag according to claim 1 in which said flag portion has a cavity therein adapted to receive a wave transmitter.

10. A tag according to claim 1 which is moulded from a nontoxic resilient synthetic plastics material.

11. A method of providing identification means on an animal having a sinus cavity comprising providing an identification tag with a shank thereon, forming a hole in the animal's skull to enter the animal's sinus cavity, inserting said shank of said tag into said hole, and providing retaining means on said shank within said cavity to prevent withdrawal of said shank.

12. A method according to claim 11 in which said hole is formed prior to the insertion of said shank.

References Cited
UNITED STATES PATENTS 3,205,602   9/1965   Trinkle _____ 40—300

EUGENE R. CAPOZIO, *Primary Examiner.*

W. GRIEB, *Assistant Examiner.*